United States Patent
Laing

[15] 3,667,324
[45] June 6, 1972

[54] PLANETARY CARRIER ASSEMBLY AND METHOD OF MANUFACTURE THEREOF

[72] Inventor: James Morrison Laing, Letchworth, England

[73] Assignee: Borg-Warner Limited, Letchworth, England

[22] Filed: May 15, 1970

[21] Appl. No.: 37,795

[30] Foreign Application Priority Data

June 17, 1969    Great Britain..................30,711/69

[52] U.S. Cl..................................................74/801, 74/750
[51] Int. Cl..........................................F16h 1/28, F16h 3/44
[58] Field of Search..................................74/801, 750

[56] References Cited

UNITED STATES PATENTS

| | | |
|---|---|---|
| 3,527,121 | 9/1970 | Moore..........................74/801 X |
| 3,071,986 | 1/1963 | Schwerdhofer.................74/802 |
| 3,344,689 | 10/1967 | Naumann......................74/801 |
| 3,407,686 | 10/1968 | Tuck et al.....................74/765 X |
| 3,249,189 | 5/1966 | Schjolin et al................192/70.12 |
| 1,799,740 | 4/1931 | Felton..........................74/801 |
| 2,505,002 | 4/1950 | Orr..............................74/801 |
| 3,495,298 | 2/1970 | Engle et al....................74/711 X |
| 3,509,784 | 5/1970 | Mahoney......................74/759 X |

Primary Examiner—Arthur T. McKeon
Attorney—Robert L. Zeig

[57] ABSTRACT

A planetary carrier assembly for a transmission in which the support for the planet pinions is provided by a preassembled sheet metal part formed of a support member, a spacer and a plate member secured together by welding. Aligned holes are bored in the three parts after welding to accommodate shafts for the pinions, thrust bearing washers being located between the planet gears and the support and plate members. The pinions are secured by an upsetting operation on the plate member and the support member at adjacent the ends of the pinion shafts.

6 Claims, 7 Drawing Figures

PATENTED JUN 6 1972 3,667,324

Inventor
JAMES M. LAING
By Robert L. Zieg
Attorney

Inventor
JAMES M. LAING

By Robert L. Zieg
Attorney

PLANETARY CARRIER ASSEMBLY AND METHOD OF MANUFACTURE THEREOF

The present invention relates to a planetary carrier assembly and includes also a method of manufacture thereof. Planetary carrier assemblies are utilized in planetary gear constructions which include a sun gear, a plurality of planetary gears, and a surrounding ring gear, the sun gear and the ring gear being advanced in mesh with the planet pinion gears. Conventionally, the planet pinion gears are carried in a cast and/or machined member, which involves a relatively costly operation.

The present invention provides an improved planetary carrier assembly and provides for the making of the assembly in a more economical yet as efficient manner as heretofore.

According to one aspect of the present invention, there is provided a planetary carrier assembly comprising a sheet metal plate member and a sheet metal spacer secured thereto, as by welding, and a support plate secured to said spacer, said spacer, plate member and support plate having openings or apertures therethrough for receiving pinion supporting shafts on which planetary pinion gears are capable of being mounted. The pinion shafts may be secured in the assembly by deformed portions of the assembly adjacent either end of the shafts. The pinion gears may be provided with thrust bearings on either side thereof between the pinion gears and the sheet metal carrier assembly. The plate member may form a generally radial end wall of a drum having axially extending portions formed thereon, in which axially extending spline-like teeth are formed around the periphery thereof, by a sheet metal deforming operation, so as to form a torque transmitting connection with a mating part. This mating part may be of a planetary gear set, or of a set of clutch plates, if the assembly is used in an automatic transmission.

With regard to the method of construction, the invention provides a method of securing a rotary member in a sheet metal assembly, comprising the steps of providing apertures or openings in the sheet metal assembly; positioning said rotary member having a bore therethrough in said sheet metal assembly in alignment or register with said apertures or openings; assembling a supporting shaft through said apertures or openings and said bore in said rotary member; and securing said shaft in said assembly by deforming areas of said sheet metal assembly adjacent the ends of said shaft.

The invention provides further a method of manufacturing a planetary carrier assembly comprising the steps of forming a plate member, a spacer member and a support plate of sheet metal; securing said sheet metal plate member to said sheet metal spacer, as by welding, securing said support plate to said spacer, forming aligned apertures or registered openings through said spacer member, plate member and support plate; and assembling pinion supporting shafts on which are mounted planetary pinion gears in said assembly, preferably by deforming said sheet metal plate members in the area near the ends of said shaft.

In order that the invention may more readily be understood, the following description is given, merely by way of example, reference being made to the accompanying drawings, in which.

Figure 6:
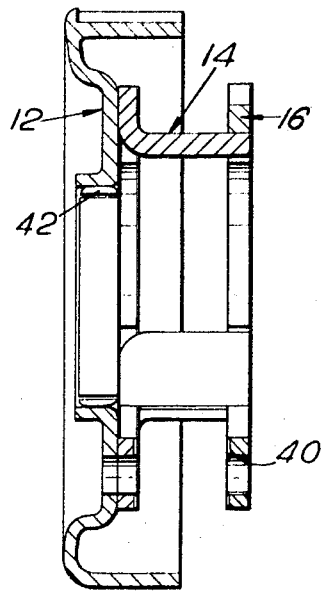
FIG. 6 shows the sub-assembly of the plate member, spacer and support plate.

In carrying the invention into effect in one convenient manner, by way of example, the improved assembly is indicated by the general reference numeral 10. This comprises a drum 12, to which is secured a spacer 14 carrying a support plate 16. Mounted in this subassembly, which is also illustrated in FIG. 6, are planetary pinion gear assemblies 18, which in this particular assembly are three in number and are adapted to mesh both with a ring gear and a sun gear (not shown).

Figure 1:
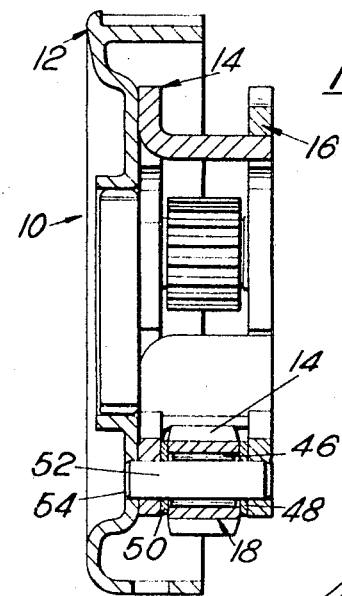
FIG. 1 is a cross-section taken on the line II—II of FIG. 2, through one embodiment of planetary carrier assembly according to the invention.
Figure 2:
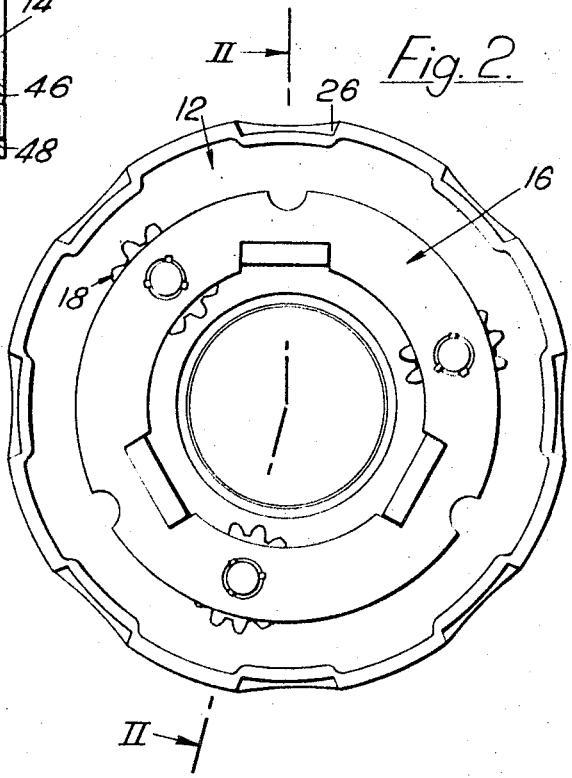
FIG. 2 is an end elevation of the assembly of FIG. 1.
Figure 3:
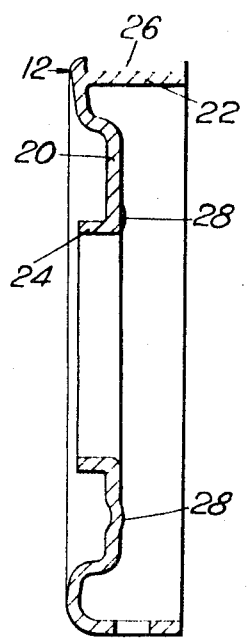
FIG. 3 is a section through the drum and plate member of FIG. 1.

As can be seen in greater detail in FIG. 3, the drum 12 is formed with a generally radial wall 20, which serves as a plate member. The drum also includes an outer cylindrical wall 22 and an inner cylindrical hub 24. The outer cylindrical wall 22 is provided with equally circumferentially spaced keying lugs 26, which are formed during pressing of the drum so as to be of inverted U-shape and may be in the form of pressed-out portions as seen in FIG. 2, which serve, in a complete automatic gearbox, to form a torque transmitting connection to a further part. At equi-angularly spaced locations, the radial wall 20 is provided with projections 28 capable of use in a welding of the sheet metal parts together.

Figure 5:
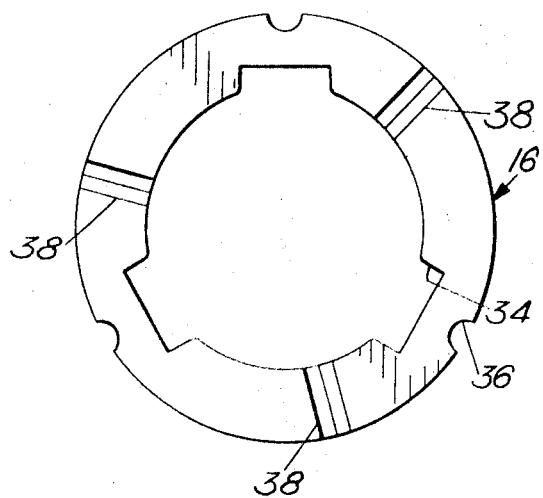
FIG. 5 is an end elevation of the support plate of FIG. 1.

As can be seen in FIG. 5, the support plate 16 is an annular sheet metal disc formed with equi-angularly spaced slots 34, of generally rectangular cross-section, and at the same angular location, on the outer periphery, semi-circular slots 36. At an asymmetric location between the slots 34, 36, are equi-angularly spaced radial grooves 38 which are shown in the particular example as being formed as V-shaped grooves having an apex angle of about 160°.

Figure 4:
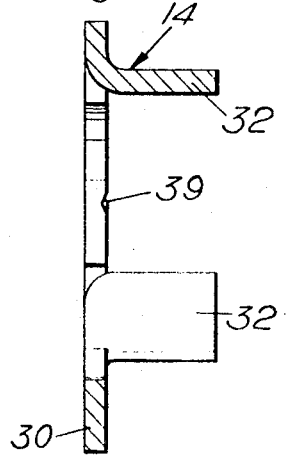
FIG. 4 is a section through the spacer member of FIG. 1.

FIG. 4 illustrates more clearly the construction of the spacer member 14, this including an annular disc 30, and equi-angularly spaced axially extending tangs 32. Grooves 39 are formed in the spacer 14 illustrated in FIG. 4 at the same locations as grooves 38 of support plate 16.

Each of the members 12, 14 and 16 are formed from sheet metal and are capable of being brought to the shape indicated in FIGS. 3, 4 and 5 solely by pressing operations. In the assembly of these members, the subassembly illustrated in FIG. 6 is first produced. This may be effected, for example, by resistance projection welding the drum 12 to the spacer 14, using the welding projections 28. Subsequently, the support plate 16 is positioned on the tangs 32 so that the free ends are engaged in the slots 34 of the support plate, but do not project beyond the outer surface of the support plate. These two members can be then secured together, for example by tungsten inert gas spot welding.

Three holes are bored through the support plate 16, the disc portion 30 of the spacer 14 and the wall 22 of the drum 12 by a suitable jig-boring technique, the holes being bored at the angular locations of the grooves 38 and 39 in the support plate 16 and the spacer 14.

It will be appreciated that by boring these holes after assembly of the parts, an accurate axial alignment thereof is achieved. A bushing 42 is then pressed into the cylindrical hub 24 of the drum 12 and is accurately bored to size.

Figure 7:
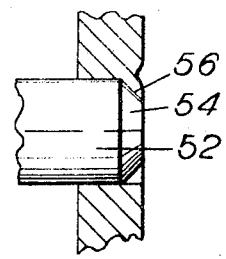
FIG. 7 is an enlarged view showing the deformation of the support plate to secure a pinion shaft in place.

The next step in making the completed assembly is to insert the planetary pinion gear assemblies 18 in the subassembly of FIG. 6. The planetary pinion gear assemblies each comprise a pinion 44, needle bearings 46 and two thrust washers 48, 50, all of these members being mounted on a pinion support shaft 52 which is provided at each end with a chamfer 54. In the assembled position, the pinions bear, through the needle bearings 46, on the pinion support shafts 52 and are axially guided by the thrust washers 48 and 50. Next, the pinion shafts may be secured in the assembly by deforming the support plate 16 and the drum 12 in the area around the apertures 40. As illustrated in detail in FIG. 7, the deforming may be carried out to form one deformed portion 56, or optionally, several areas around shaft 52 may be deformed to provide a plurality of deformed portions. The deformed portion 56 at each end of each pinion support shaft 52 serves to hold the pinion support shaft in position, against axial displacement.

In use the grooves 38 and 39 serve to act as lubricating guideways or passageways for oil, which flows therealong to lubricate the pinion assemblies 18.

This invention provides that a complete planetary carrier assembly can be formed by the simple operation of forming an assembly from sheet metal parts and securing the parts together by a simple welding or equivalent operation. It will be appreciated that this is considerably less expensive than the conventional method of construction of a planetary carrier assembly.

I claim:

1. A planetary carrier assembly comprising a sheet metal plate member having a sheet metal spacer welded thereto at one end of said spacer; a support plate welded to said spacer at the other end thereof, said spacer, plate member and support plate having aligned apertures therethrough, said apertures receiving pinion supporting shafts on which are mounted planetary pinion gears, and including thrust bearings located between said pinion gears and said assembly on either side of said pinion gears.

2. An assembly according to claim 1 in which said pinion shafts are secured in said assembly by deformed portions of said assembly adjacent either end of said shafts.

3. An assembly according to claim 2 in which the ends of said pinion shafts are chamfered.

4. An assembly according to claim 1 in which said plate member forms a generally radial end wall of a drum having an axially extending portion including axially extending lugs around the periphery thereof, said lugs adapted to form a torque transmitting connection with a mating support.

5. An assembly according to claim 4 wherein said axially extending portion with axially extending lugs is located at the radially outer edge of said radial end wall, and a second axially extending wall is located at the radially inner edge of said end wall, in the form of a cylindrical hub.

6. An assembly according to claim 1 wherein radial grooves are formed in said spacer and support plate at the location of said pinion shafts to act as lubrication passages for oil to lubricate said pinions.

* * * * *